(12) United States Patent
Takamoto et al.

(10) Patent No.: US 6,249,377 B1
(45) Date of Patent: *Jun. 19, 2001

(54) PORTABLE SCREEN ASSEMBLY

(75) Inventors: Hideo Takamoto; Tetsujiro Omura, both of Chuo-ku; Kazuharu Seki, Setagaya-ku, all of (JP)

(73) Assignee: Izumi-Cosmo Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,440

(22) Filed: Aug. 28, 1998

(30) Foreign Application Priority Data

Sep. 5, 1997 (JP) .................................................... 9-240893
Feb. 26, 1998 (JP) .................................................. 10-045630

(51) Int. Cl.$^7$ ............................... G03B 21/56; A47G 5/02
(52) U.S. Cl. ............................................. 359/461; 160/265
(58) Field of Search .................................... 359/443, 461, 359/451; 160/24, 265, 370.22; 16/80, 92; D16/241

(56) References Cited

U.S. PATENT DOCUMENTS

| 354,450 | * | 12/1886 | Tripp ...................................... 160/237 |
| 1,915,944 | * | 6/1933 | Nagel ....................................... 160/24 |
| 1,981,444 | * | 11/1934 | Wittel ....................................... 160/24 |
| 5,438,780 | * | 8/1995 | Winner ..................................... 40/514 |
| 5,581,401 | * | 12/1996 | Takamoto et al. ..................... 359/443 |
| 5,706,130 | * | 1/1998 | Rosen ..................................... 359/443 |
| 5,798,861 | * | 8/1998 | Doat ....................................... 359/461 |
| 5,839,706 | * | 11/1998 | Liu ......................................... 248/188 |

FOREIGN PATENT DOCUMENTS 4-331943   11/1992   (JP) ................................. G03B/21/58

* cited by examiner

Primary Examiner—Christopher E. Mahoney
(74) Attorney, Agent, or Firm—Wenderoth, Lind & Ponack, L.L.P.

(57) ABSTRACT

A portable screen assembly includes first and second frames extending parallel to each other, a spring-biased roll rotatably mounted in the first frame, and a screen bonded at its one end to the second frame and wound around the spring-biased roll. An extender is provided for biasing the first and second frames away from each other to impart a predetermined tension to the screen. During use of the portable screen assembly, the first and second frames are supported generally verically by a purality of support legs.

6 Claims, 13 Drawing Sheets

PORTABLE SCREEN ASSEMBLY

BACKGROUND OF THE INVENTION 1. (Field of the Invention)

The present invention relates generally to a screen for displaying, on an enlarged scale, an image projected by a projector or a projection TV set and in particular but not exclusively to a portable screen assembly that is easy to carry and can be installed at an optional location such as, for example, on a floor, a table or the like.

2. (Description of Related Art)

An image projected by a projector or, in some cases, a projection TV set is generally displayed, on an enlarged scale, on a reflection type screen or a transmission type screen.

Of such screens, some are generally accommodated in a housing mounted on a ceiling or a side wall, and are electrically or manually extended as occasion demands. Hanging screens or screens with a tripod are used by hanging or locating them at a desired place.

Portable screen assemblies are today available in which a screen is wound around a roll housed in a housing. When such screen assemblies are in use, the housing is initially installed at a desired place, and the screen is subsequently extended by, for example, an extension means somewhat similar to a pantograph by the action of the biasing force of a spring mounted therein.

Recently, the number of meeting or conference increases in companies or offices and there is an increasing demand for a portable screen assembly of a simple structure that is easy to carry with a projector and can be installed on a floor, a desk or a table in a conference room to display an image projected by the projector.

SUMMARY OF THE INVENTION

The present invention has been developed in view of such a demand.

It is accordingly an objective of the present invention to provide an inexpensive portable screen assembly of a simple construction that is handy and easy to carry with a projector.

In accomplishing the above and other objectives, the portable screen assembly according to the present invention includes first and second frames extending parallel to each other, a spring-biased roll rotatably mounted in the first frame, a screen bonded at one end thereof to the second frame and wound around the spring-biased roll, an extender for biasing the first and second frames away from each other to impart a predetermined tension to the screen, and a plurality of support legs for supporting the first and second frames generally vertically during use.

This construction is simple, facilitates carrying and handling of the portable screen assembly, and reduces the manufacturing cost thereof.

Advantageously, the extender includes an elastic member having an elastic force, which is determined appropriately relative to an elastic force of a spring mounted in the spring-biased roll so that the first and second frames can be retained at a desired interval.

By this construction, the width of the screen can be adjusted according to the distance between the screen and a projector.

Conveniently, the extender includes a first pair of rails extending parallel to each other and a second pair of rails extending parallel to each other, with the first pair of rails hingedly connected to the second pair of rails.

Alternatively, the extender includes a pair of rails hingedly connected to each other at first ends thereof and also hingedly connected to the first and second frames, respectively, at second ends thereof.

Because only a pair or two pairs of rails are needed for the extender, extension or folding of the extender prior to or after the use of the portable screen assembly can be readily performed.

Advantageously, the first and second frames are used as casings for accommodating and protecting the spring-biased roll, the screen, and the extender when the portable screen assembly is not in use.

By this construction, the two frames service both as the supporting members for supporting the screen and the casings for protecting internal component parts and, hence, the portable screen assembly can be made compact and inexpensive.

Again advantageously, each of the plurality of support legs includes a plurality of first walls formed thereon and having respective projections formed therewith, while each of the first and second frames includes a plurality of second walls formed thereon.

By this construction, the support legs are retained as extended by causing the first walls to abut against the second walls, respectively, while the support legs are folded by releasing abutment of the first walls against the second walls. Because a force applied to each support leg can be dispersed by virtue of engagement between the plurality of first walls and the plurality of second walls, even a soft and fragile material such as, for example, a resin can withstand a relatively large force, reducing the manufacturing cost of the support legs.

Conveniently, each of the projections has a first inclined surface formed on one side thereof, wherein a lead-in force of each support leg onto an associated one of the first and second frames is generated during folding of the support leg by causing the first inclined surface to abut against an edge of an associated one of the second walls.

This construction requires no additional leg locking means to lock the support legs at their rest positions, making it possible to simplify the construction of the support legs and to manufacture the support legs at a low cost.

Also conveniently, each of the projections has a second inclined surface formed on the other side thereof, wherein the second inclined surface is in abutment with the edge of the associated one of the second walls when each support leg has been extended, preventing an external force from damaging the support leg.

In the above-described construction, the first and second inclined surfaces extend so as to cross each other.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 9-240893 and 10-45630 filed Sep. 5, 1997 and Feb. 26, 1998, respectively, in Japan, the content of which is incorporated hereinto by reference.

Figure 1:
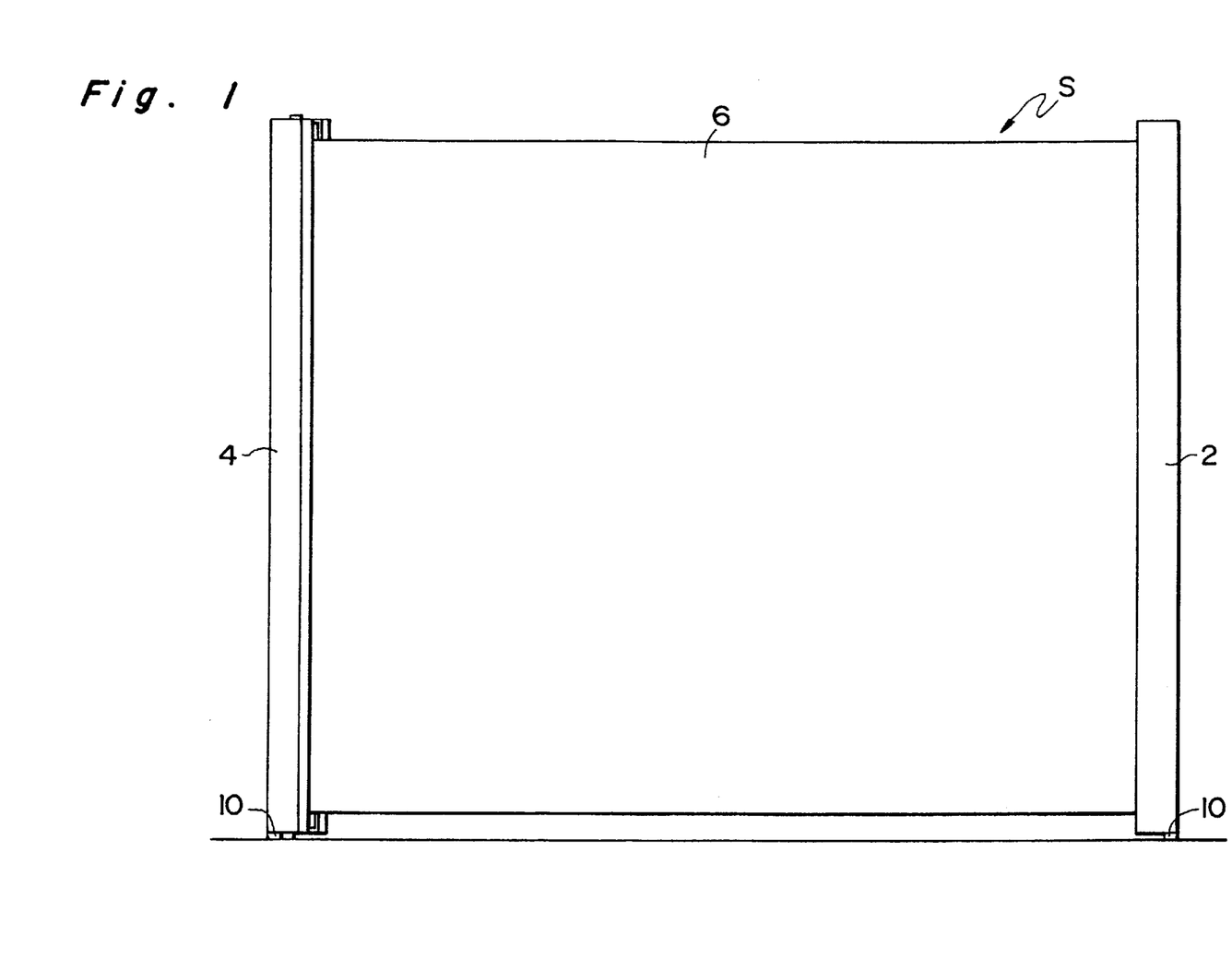
FIG. 1 is a front view of a portable screen assembly according to a first embodiment of the present invention.
Figure 2:
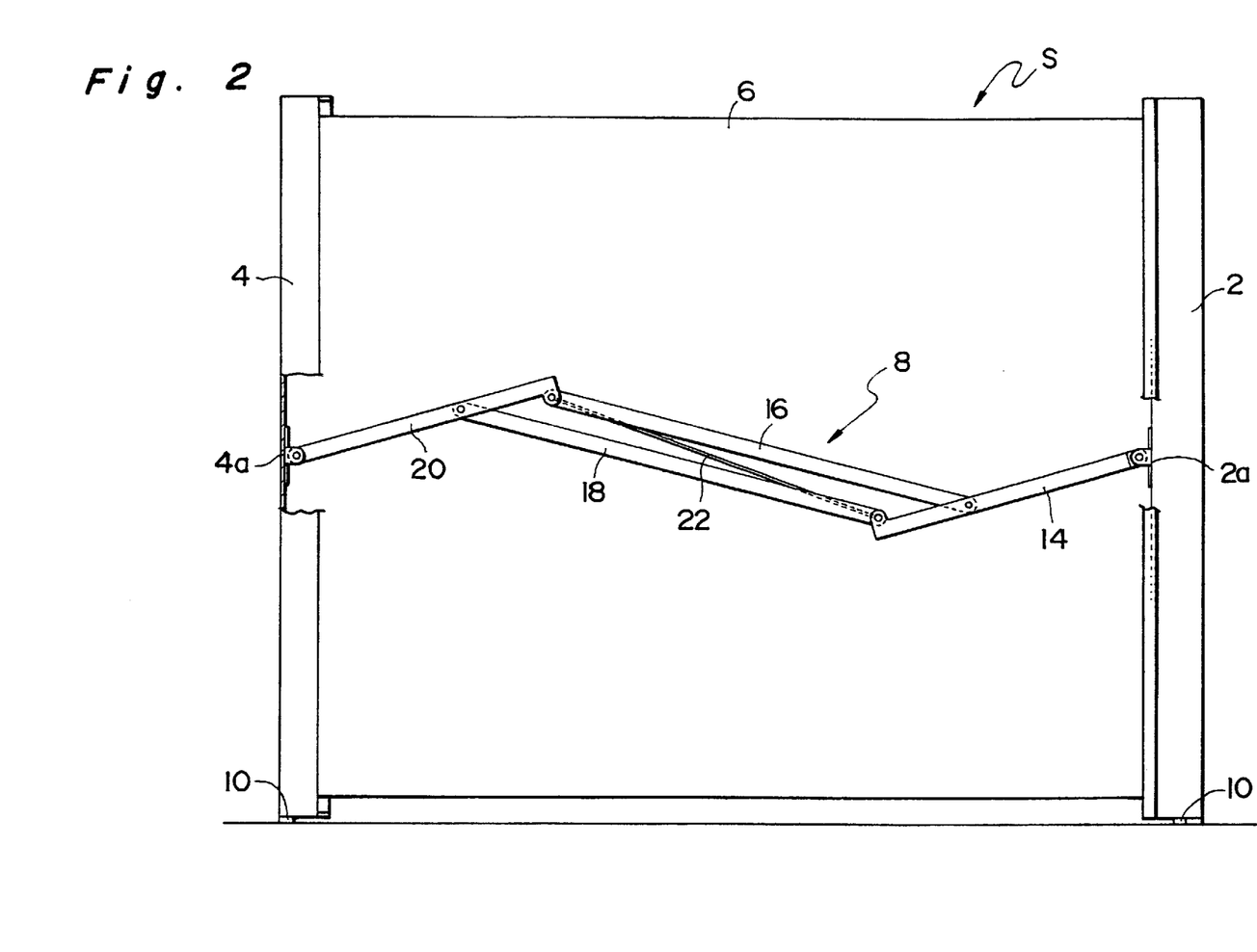
FIG. 2 is a rear view, partly in section, of the portable screen assembly of FIG. 1.
Figure 3:
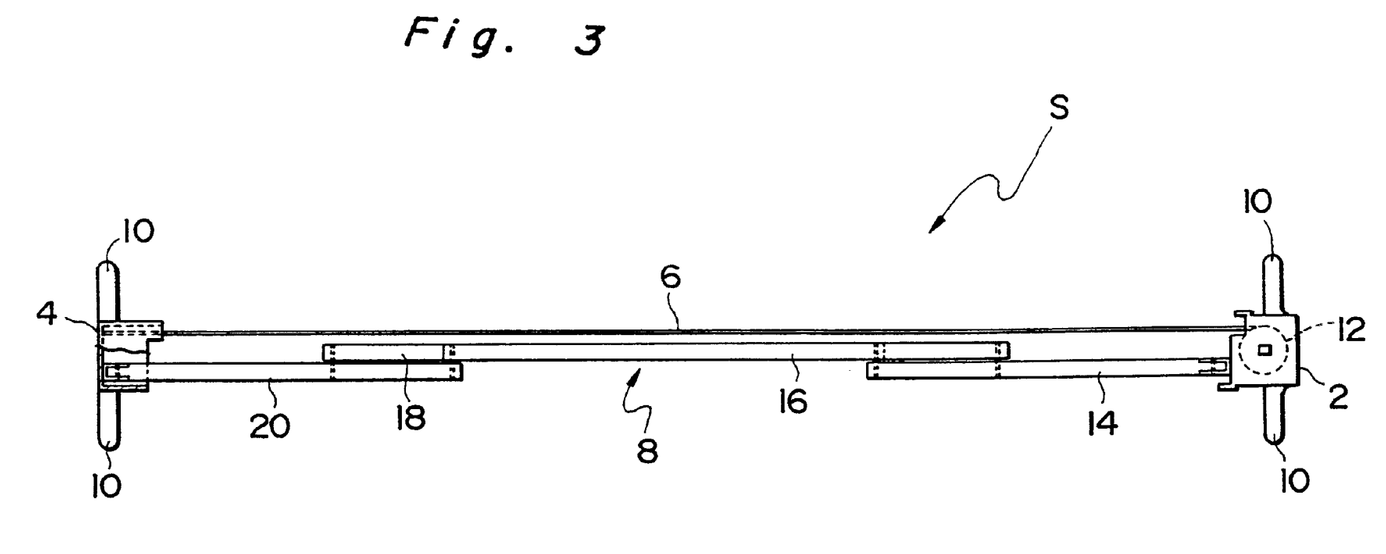
FIG. 3 is a top plan view, partly in section, of the portable screen assembly of FIG. 1.

Referring now to the drawings, FIGS. 1 to 3 depict a portable screen assembly S according to a first embodiment of the present invention, shown as extended during use thereof. The portable screen assembly S includes two frames 2, 4 made of, for example, aluminum and extending parallel to each other, a screen 6 extended between the two frames 2, 4, an extender or extension means 8 for biasing the frames 2, 4 away from each other so as to maintain them at a desired interval, and a plurality of support legs 10 hingedly connected to lower ends of the frames 2, 4 to hold the frames 2, 4 generally or approximately vertically. The frame 2 accommodates a spring-biased roll 12 rotatably mounted therein around which the screen 6 is wound. The screen 6 has one side edge bonded to the spring-biased roll 12 and the other side edge bonded to an angled member (described later) secured to an inner surface of the frame 4.

The screen 6 is a known one that has a base fabric made of, for example, glass or PET, a reflective layer bonded to the base fabric, a bead layer or a polarization layer formed on the reflective layer, and a resin layer covered on the bead or polarization layer.

Figure 4:
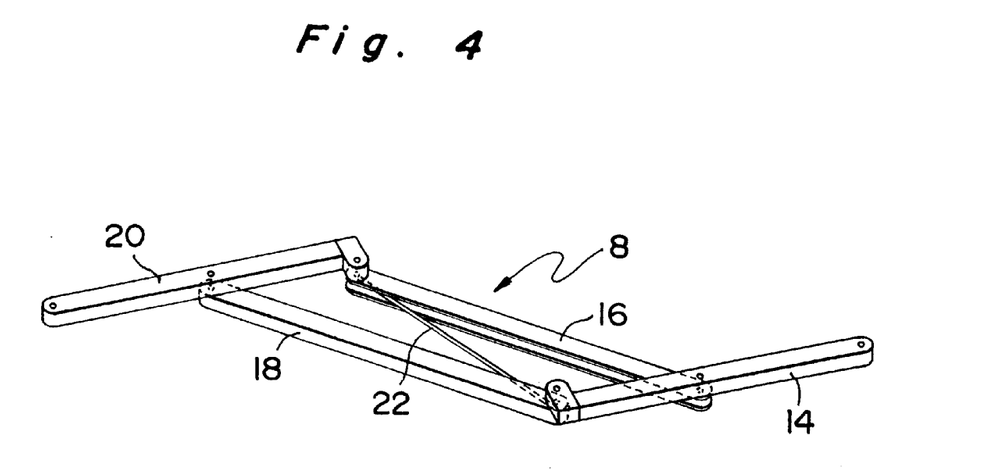
FIG. 4 is a perspective view of an extender mounted in the portable screen assembly of FIG. 1.

As shown in FIG. 4, the extender 8 includes a pair of rails 14, 20 extending parallel to each other and another pair of rails 16, 18 extending parallel to each other. Each of the rails 14, 16, 18, 20 has a generally U-shaped cross section. These rails 14, 16, 18, 20 are hereinafter referred to as first, second, third and fourth rails, respectively. The first rail 14 has one end hingedly connected to an intermediate portion 2a of the frame 2, an intermediate portion hingedly connected to one end of the second rail 16, and the other end hingedly connected to one end of the third rail 18. The other end of the second rail 16 and that of the third rail 18 are hingedly connected to one end and an intermediate portion of the fourth rail 20, respectively, while the other end of the fourth rail 20 is hingedly connected to an intermediate portion 4a of the frame 4. In other words, as particularly shown in FIG. 2, first rail 14 is hinged at one point only to first frame 2, and fourth rail 20 is hinged at one point only to second frame 4. As also shown in FIG. 2, the point of hinged connection of first rail 14 to first frame 2 and the point of hinged connection of fourth rail 20 to second frame 2 are at substantially the same height or level along the vertically extending lengths of first and second frames 2, 4. The two frames 2, 4 are biased away from each other by an elastic member 22 such as, for example, a coil spring that has one end connected to a hinged portion between the first and third rails 14, 18 and the other end connected to a hinged portion between the second and fourth rails 16, 20.

Figure 5:
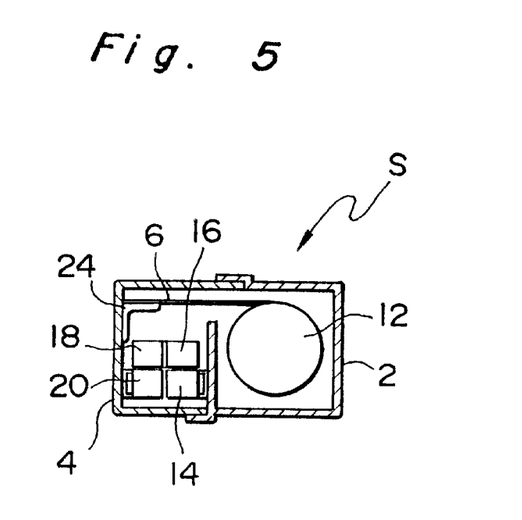
FIG. 5 is a horizontal sectional view of the portable screen assembly of FIG. 1 when it is closed.
Figure 6:
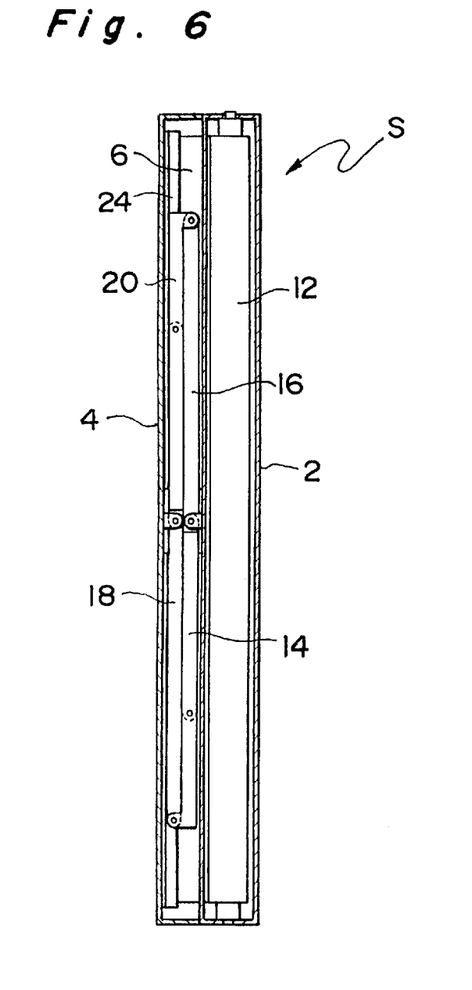
FIG. 6 is a vertical sectional view of the portable screen assembly of FIG. 1 when it is closed.
Figure 7:
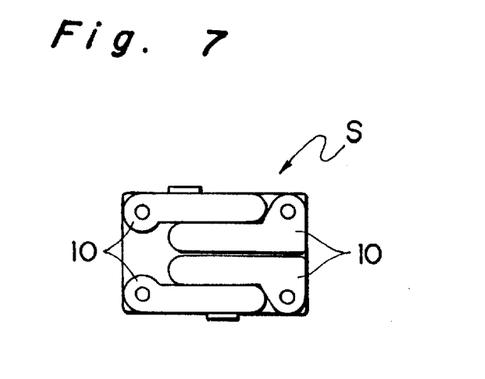
FIG. 7 is a bottom plan view of the portable screen assembly of FIG. 1 when it is closed.

FIGS. 5 to 7 depict the portable screen assembly S when the two frames 2, 4 are mated to each other after the use of the portable screen assembly S. In this condition, the two frames 2, 4 act as casings for protecting the internal component parts such as the spring-biased roll 12, the screen 6 completely wound therearound and the like. Because the plurality of support legs 10 are hingedly connected to four corners of the bottom surfaces of the frames 2, 4, rotation of the support legs 10 results in storage thereof on the bottom surfaces of the frames 2, 4, preventing the support legs 10 from protruding laterally from the frames 2, 4 (FIG. 7). In the figures, reference numeral 24 denotes an angled member which is secured to an inner surface of the frame 4 and to which one end of the screen 6 is bonded.

The portable screen assembly S of the above-described construction operates as follows.

As shown in FIGS. 5 to 7, when the portable screen assembly S is not in use, the two frames 2, 4 are mated to each other so that opposing surfaces thereof are held in contact with each other. In this condition, the whole portable screen assembly S takes the form of a generally rectangular parallelopiped and, hence, it is very easy to carry and store. At this moment, the screen 6 is completely wound around the spring-biased roll 12 by the biasing force of a spring (not shown) mounted in the spring-biased roll 12, while the extender 8 comprised of the four rails 14, 16, 18, 20 is completely folded so as to extend parallel to the spring-biased roll 12, as shown in FIGS. 5 and 6. Also, the plurality of support legs 10, which support the frames 2, 4 during use of the portable screen assembly S, are held on the bottom surfaces of the frames 2, 4 so as not to protrude from the side surfaces of the frames 2, 4, as shown in FIG. 7. Accordingly, storage and carrying of the screen body is not hindered.

When the portable screen assembly S is used, the support legs 10 are first rotated so as to protrude from the side surfaces of the frames 2, 4 until the support legs 10 become generally perpendicular to the screen surface. By so doing, the frames 2, 4 are positively supported by the support legs 10 and extend generally perpendicular to the surface on which the portable screen assembly S is installed (FIG. 3). By subsequently pulling one of the frames 2, 4 relative to the other, the screen 6 is drawn out of the spring-biased roll 12 against the biasing force of the spring mounted in the spring-biased roll 12, and a predetermined tension is imparted to the screen 6 by the extender 8, as shown in FIGS. 1 to 3.

It is to be noted here that the biasing force of the elastic member 22 of the extender 8 is determined in consideration of the spring force of the spring-biased roll 12 and, hence, the interval between the frames 2, 4 can be appropriately set according to the distance between the screen 6 and a projector.

When the portable screen assembly S is stored, the extender 8 comprised of the four rails 14, 16, 18, 20 is folded and the screen 6 is wound around the spring-biased roll 12 simply by pushing one of the frames 2, 4 relative to the other. Closure of the portable screen assembly S is completed by rotating all the support legs 10 to respective positions as shown in FIG. 7.

Figures 8A, 8B:
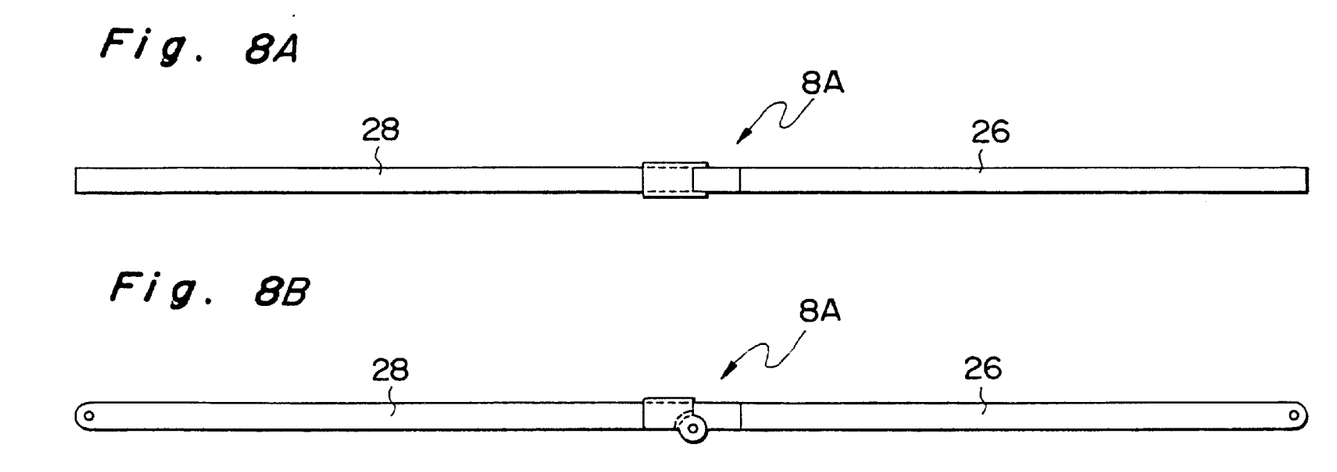
FIG. 8A is a top plan view of a modification of the extender when it has been extended.
FIG. 8B is a front view of the extender of FIG. 8A.
Figure 8C:
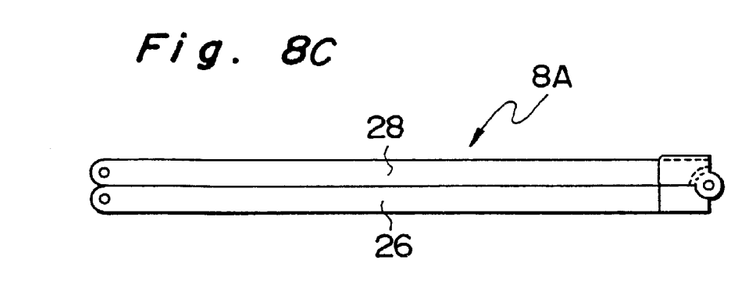
FIG. 8C is a front view of the extender of FIG. 8A when it has been folded.

FIGS. 8A to 8D depict a modification 8A of the extender. FIGS. 8A and 8B depict the condition in which the extender 8A has been completely extended, while FIG. 8C depicts the condition in which the extender 8 has been completely folded.

As shown in FIGS. 8A, 8B and 8C, the extender 8A includes a pair of rails 26, 28 having a generally U-shaped cross section. The first rail 26 has one end hingedly connected to the intermediate portion 2a of the frame 2 and the other end hingedly connected to one end of the second rail 28 via a pin (not shown). The other end of the second rail 28 is hingedly connected to the intermediate portion 4a of the frame 4.

Figure 8D:
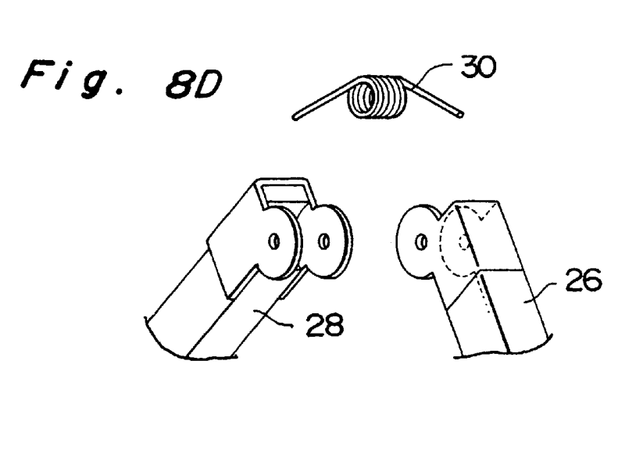
FIG. 8D is an exploded perspective view of a hinged portion between two rails of the extender of FIG. 8A.

As shown in FIG. 8D, an elastic member 30 such as, for example, a coil spring is mounted on a hinged portion between the first and second rails 26, 28 so as to bias the first and second rails 26, 28 in a direction in which they extend generally straight, as shown in FIGS. 8A and 8B.

Because the extender 8 shown in FIG. 4 and the extender 8A shown in FIGS. 8A to 8D differ only in the number of the rails and in the shape of the elastic member and are substantially identical in operation, explanation of the operation of the extender 8A is omitted.

In the above-described embodiment, the portable screen assembly S may have a locking means for locking the two frames 2, 4 so that they may not be separated from each other during storage or carrying of the portable screen assembly S. Conveniently, one of the frames 2, 4 has a handle secured thereto with which the portable screen assembly S can be readily carried.

Figure 9:
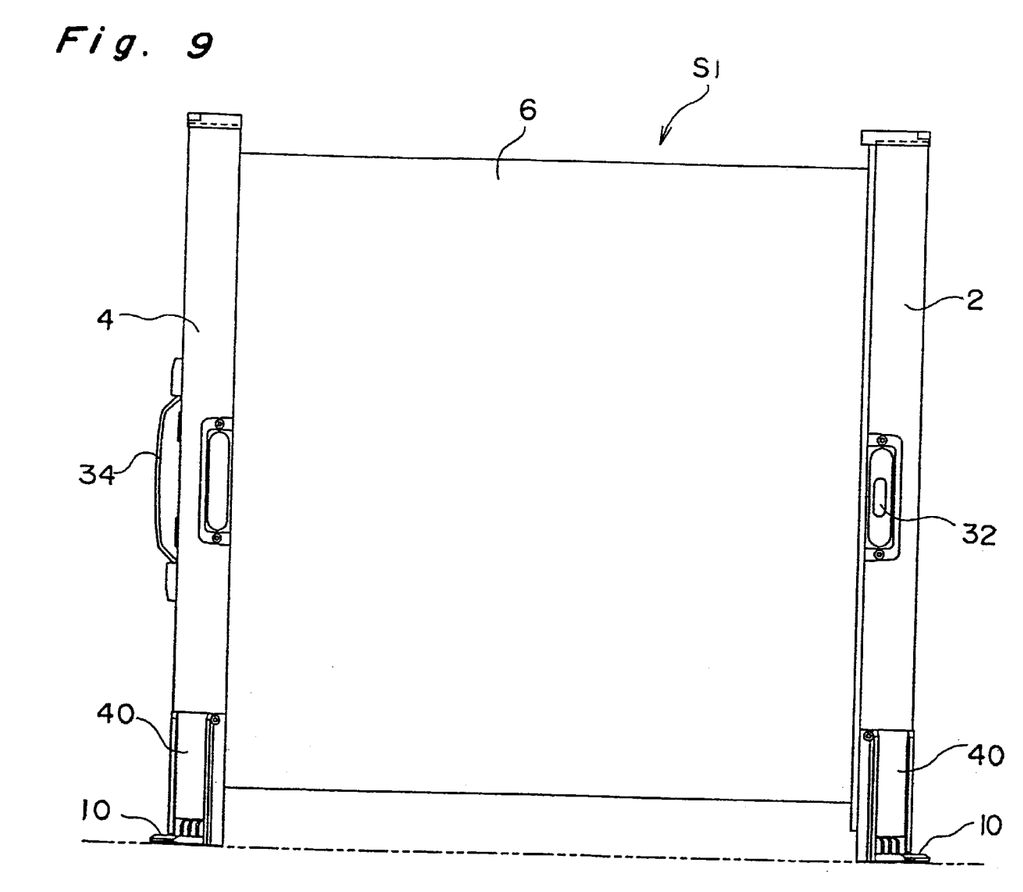
FIG. 9 is a view similar to FIG. 1, but according to a second embodiment of the present invention.
Figure 10:
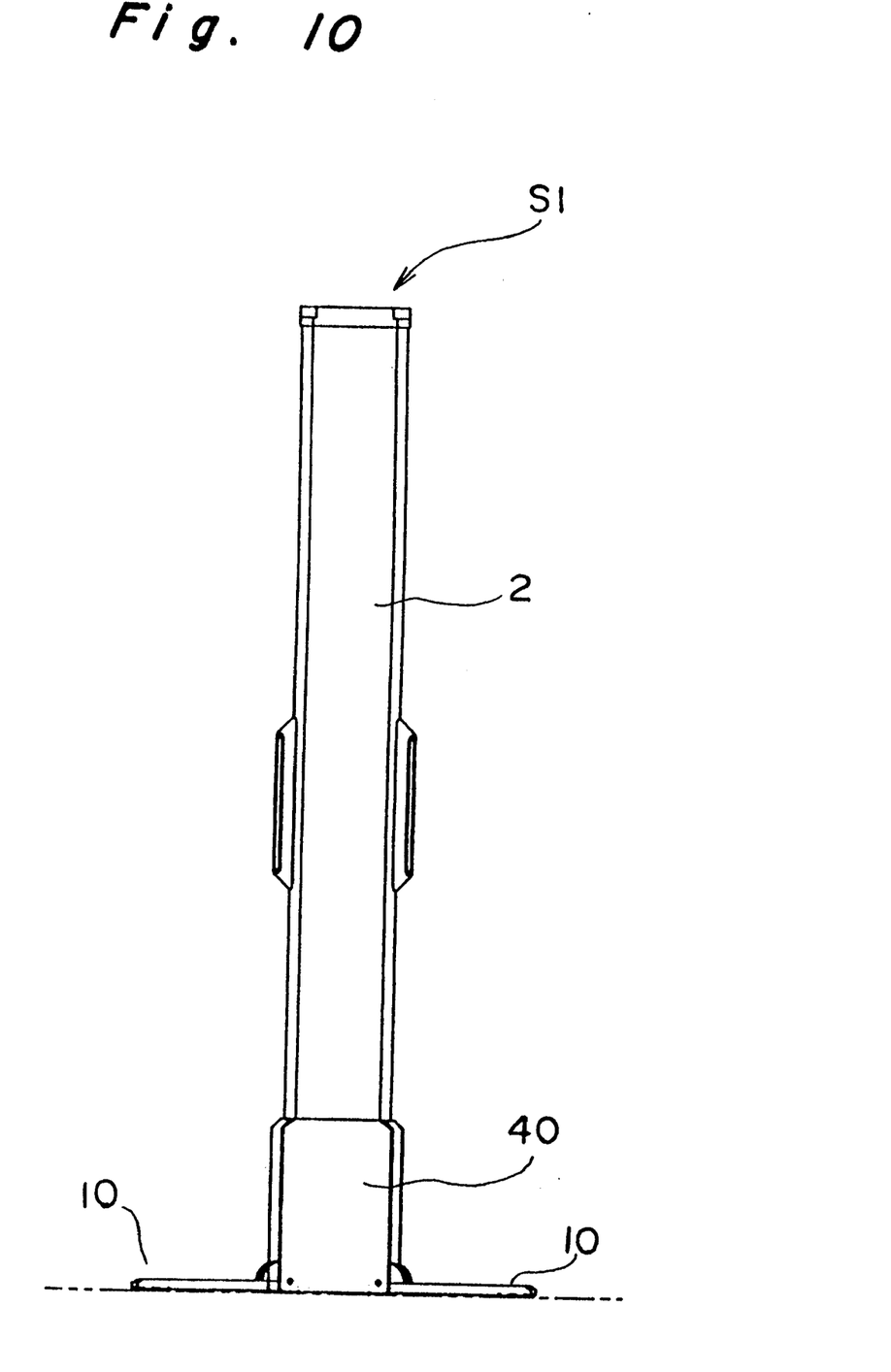
FIG. 10 is a side view of the portable screen assembly of FIG. 9.
Figure 11:
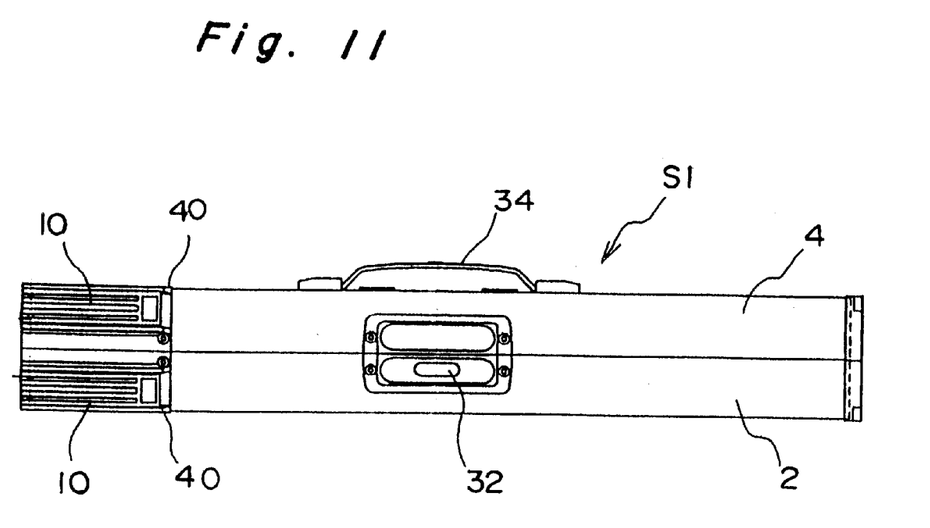
FIG. 11 is a front view of the portable screen assembly when it has been closed.
Figure 12:
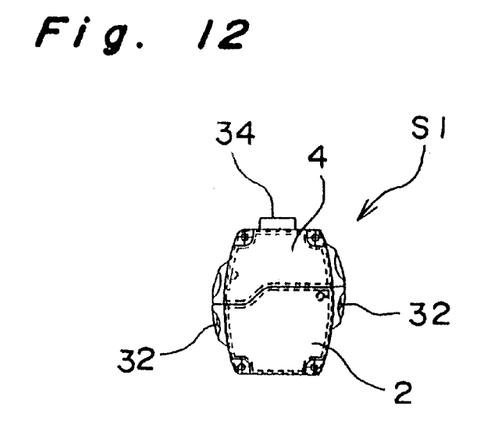
FIG. 12 is a side view of the portable screen assembly of FIG. 11.

FIGS. 9 to 12 depict a portable screen assembly S1 according to a second embodiment of the present invention. In these figures, FIGS. 9 and 10 depict the portable screen assembly S1 when it is in use, while FIGS. 11 and 12 depict the portable screen assembly S1 when it is stored or not in use.

This portable screen assembly S1 has locking means 32 for locking the two frames 2, 4 that function as casings when they are closed. The portable screen assembly S1 also has a handle 34 secured to one of the frames 2, 4 for use in carrying the portable screen assembly S1. Also, the portable screen assembly S1 differs from the portable screen assembly S according to the first embodiment of the present invention in that the plurality of support legs 10 for holding the frames 2, 4 generally or approximately vertically during use of the portable screen assembly S1 are stored on the side surfaces of the frames 2, 4.

Figure 13:
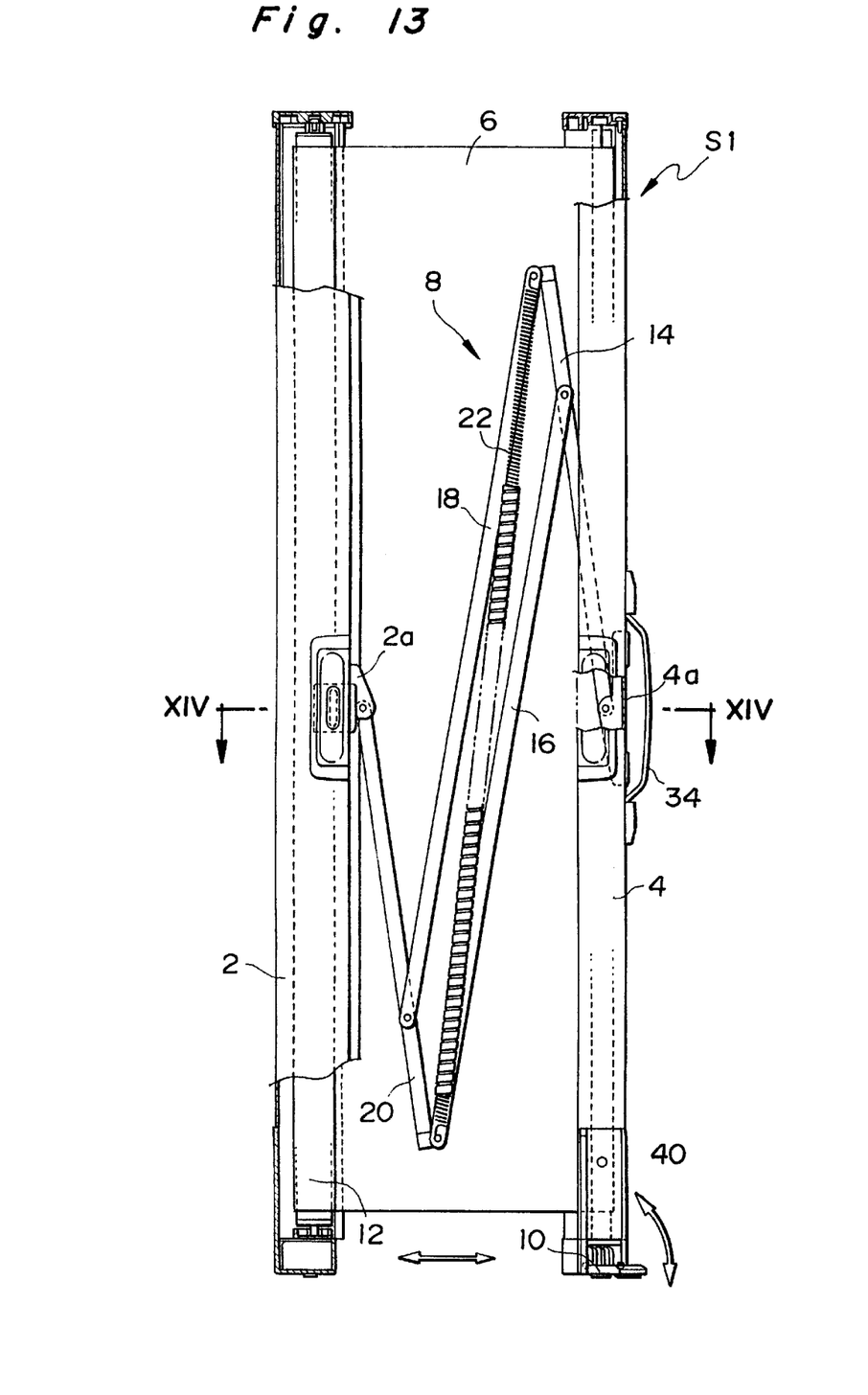
FIG. 13 is a rear view, partly in section, of the portable screen assembly of FIG. 9 when it has been extended to some extent.
Figure 14:
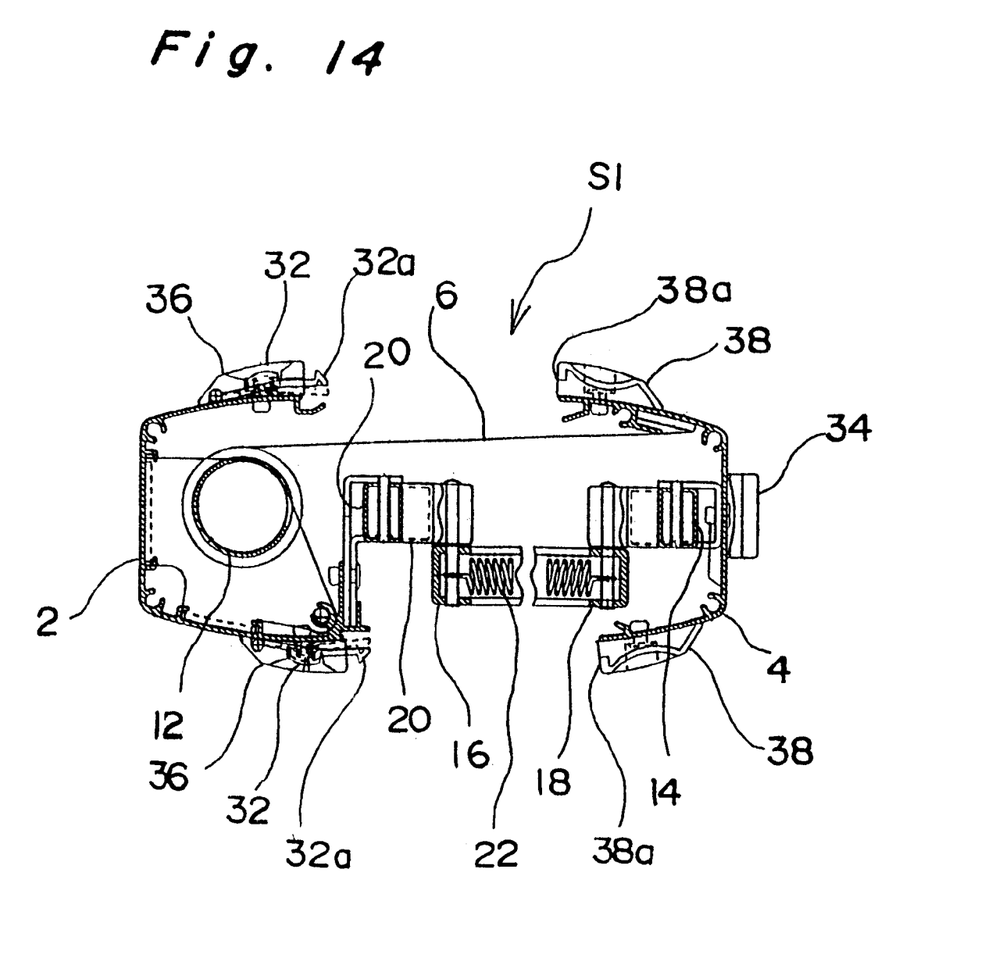
FIG. 14 is a sectional view taken along line XIV—XIV in FIG. 13.

As shown in FIGS. 13 and 14, the component parts such as the screen 6 to be extended between the frames 2, 4, the extender 8 for biasing the frames 2, 4 away from each other, the spring-biased roll 12 around which the screen 6 is wound and the like are generally identical to those mounted in the portable screen assembly S according to the first embodiment of the present invention. Accordingly, explanation of such component parts is omitted and only the differences are discussed hereinafter.

As shown in FIG. 14, each of the frames or casings 2, 4 has two grips 36 or 38 mounted on side surfaces thereof at intermediate portions in a direction longitudinally thereof. The grips 36 mounted on the frame 2 have respective locking means 32 mounted thereon. Each of the locking means 32 has a hook 32a formed therewith at a distal end thereof, while each of the grips 38 mounted on the frame 4 has a projection 38a formed therewith at a distal end thereof. Locking or release of the locking is achieved by the operation of the locking means 32, i.e, by engaging the hook 32a with the corresponding projection 38a of the grip 38 or by disengaging the former from the latter.

Figure 15:
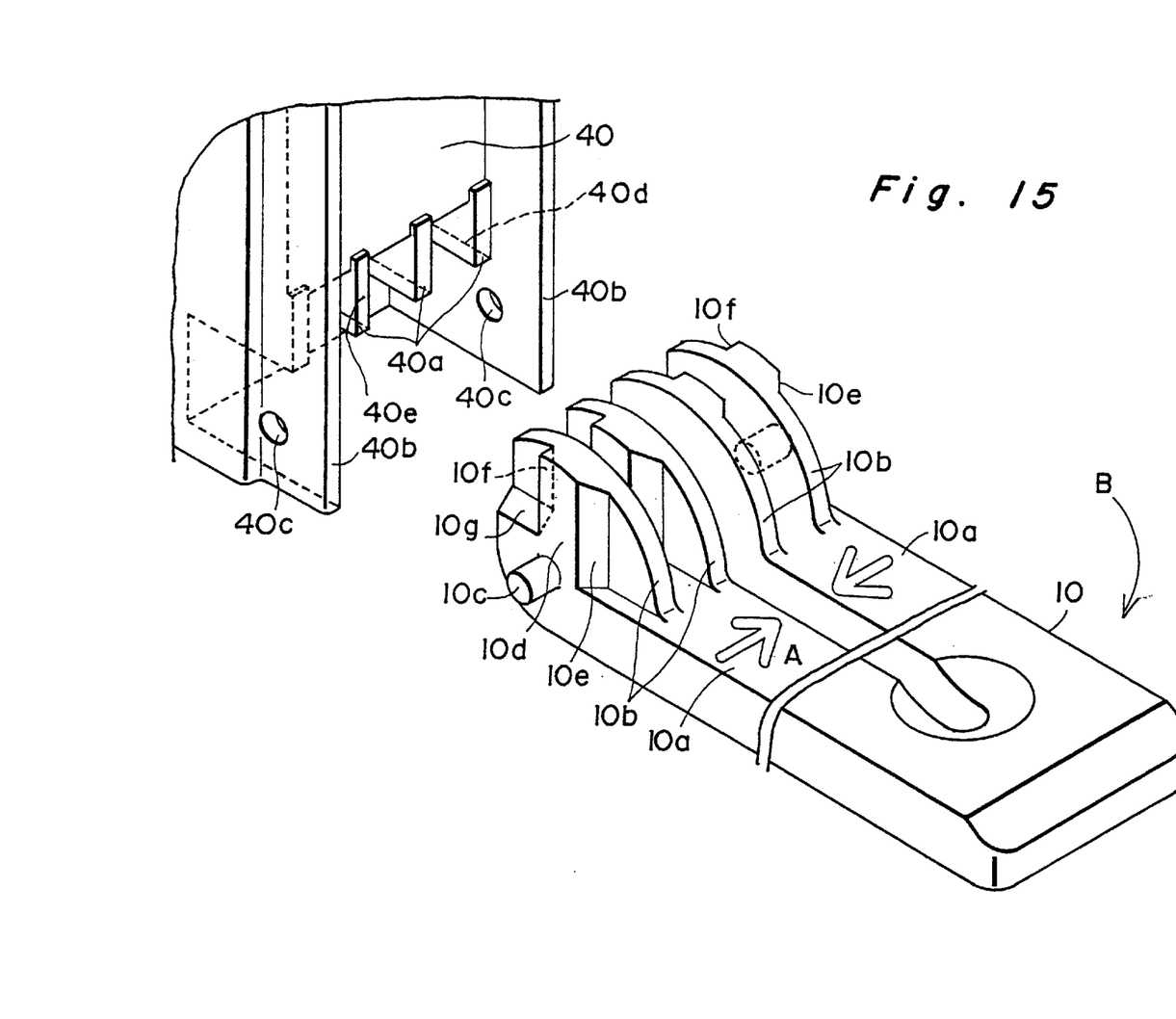
FIG. 15 is an exploded perspective view of a connecting portion between a support leg and a leg mount both mounted on the portable screen assembly of FIG. 9.

As shown in FIGS. 13 and 15, the frames 2, 4 have respective leg mounts 40 screwed down to lower portions thereof, and a plurality of, for example two, support legs 10 are hingedly connected to each of the leg mounts 40.

Each support leg 10 is generally in the form of "U" and is molded from, for example, a resinous material. Each support leg 10 has two support branches 10a that are connected to each other at a distal end thereof but separated at a proximal end thereof. Each support branch 10a has a plurality of (two in the figure) walls 10b integrally formed therewith so as to extend upwardly therefrom in parallel to one another, and also has a pin 10c integrally formed therewith so as to protrude laterally therefrom (in a direction perpendicular thereto).

Each of the walls 10b has a projection 10d integrally formed therewith so as to extend outwardly therefrom. The projection 10d has an inclined front surface 10e facing to the distal end of the support leg 10 and a non-inclined rear surface 10f facing to the proximal end of the support leg 10. Another inclined surface 10g is formed on each wall 10b so as to cross the non-inclined rear surface 10f of the projection 10d. The inclined surface 10g extends in a direction generally perpendicular to the inclined front surface 10e of the projection 10d.

On the other hand, each of the leg mounts 40 has a plurality of, for example four, downwardly extending walls 40a integrally formed therewith at a location corresponding to each support leg 10. Each of the leg mounts 40 also has two ribs 40b integrally formed therewith on respective sides of the plurality of downwardly extending walls 40a. The plurality of downwardly extending walls 40a and the two ribs 40b extend parallel to one another. The two ribs 40b have respective pin insertion holes 40c defined therein to receive the pins 10c formed on the support leg 10.

In mounting the support leg 10 on the leg mount 40, outer two walls 10b of the support leg 10 are first inserted into outer spaces of a plurality of spaces defined between the downwardly extending walls 40a of the leg mount 40, while inner two walls 10b of the support leg 10 are simultaneously inserted into a central space defined between inner two downwardly extending walls 40a of the leg mount 40. Subsequently pressing the two support branches 10a inwardly as shown by arrows A allows the pins 10c to be inserted into the corresponding pin insertion holes 40c formed in the ribs 40b of the leg mount 40.

When the portable screen assembly S1 is not in use, each support leg 10 is folded down and stored between the two ribs 40b so as to be held in contact with the side surface of the leg mount 40. In this condition, the inclined front surfaces 10e of the projections 10d abut against associated side edges 40d of bottom surfaces of the downwardly extending walls 40a, generating a lead-in force of the support leg 10. This lead-in force acts to retain the support leg 10 as folded.

When the portable screen assembly S1 is used, each support leg 10 is first rotated or unfolded in a direction shown by an arrow B against the lead-in force, thereby pressing the inclined front surfaces 10e of the projections 10d against the side edges 40d of the downwardly extending walls 40a and moving the inclined front surfaces 10e relative to the side edges 40d. At this moment, the support branches 10a receive a compressive force in the directions shown by the arrows A, which compressive force in turn makes the support branches 10a approach each other. As a result, abutment of the inclined front surfaces 10e of the projections 10d against the side edges 40d of the downwardly extending walls 40a is released, and the support leg 10 is extended in a direction generally perpendicular to the associated frame 2 or 4, holding the frame vertically.

Under the condition in which the support leg 10 has been unfolded, the non-inclined rear surfaces 10f of the projections 10d are in abutment with associated front surfaces 40e of the downwardly extending walls 40a, while the inclined surfaces 10g crossing the non-inclined rear surfaces 10f at right angles are in abutment with the side edges 40d of the downwardly extending walls 40a, thus locking the support leg 10 in the 90°-extended condition to positively hold the frame 2, 4.

In storing the support legs 10 after the use of the portable screen assembly S1 when the two support branches 10a are compressed in the directions of the arrows A by pressing side surfaces of each support leg 10, abutment of the non-inclined rear surfaces 10f of the projections 10d against the front surfaces 40e of the downwardly extending walls 40a is released, making it possible to readily fold the support leg 10.

It is to be noted here that the support legs 10 are of a failure-proof construction. That is, when the portable screen assembly S1 is being carried without folding some or all of the support legs 10, the support legs 10 are not subject to damage even if an external force is suddenly applied thereto.

More specifically, when an external force is applied to, for example, the distal end of a certain support leg 10 in the direction of the arrow B under the condition in which the support leg 10 has been extended 90° relative to the associated frame 2 or 4, the inclined surface 10g formed on the rear side of the projection 10d is pressed against the side edge 40d of the downwardly extending wall 40a and is moved relative thereto. At this moment, a compressive force in the directions of the arrows A is applied to the two support branches 10a to move them towards each other. As a result, abutment of the inclined surfaces 10g against the side edges 40d of the downwardly extending walls 40a is released, further rotating the support leg 10 in the direction of the arrow B to prevent damage of the support leg 10.

On the contrary, when a relatively large external force greater than a predetermined value is applied to the distal end of the support leg 10 in a direction counter to the arrow B under the condition in which the support leg 10 has been extended 90°, a compressive force is generated in the directions of the arrows A by virtue of the elasticity of the generally U-shaped support leg 10. Because this compressive force acts to release abutment of the non-inclined rear surfaces 10f of the projections 10d against the front surfaces 40e of the downwardly extending walls 40a, the support leg 10 is folded, preventing damage thereof.

Although in the illustrated embodiment each of the frames 2, 4 is provided with two support legs 10, two rotational axes (the pins 10c) of the latter do not lie on the same straight line but cross each other at a certain angle so that the distal ends of the two support legs 10 open outwardly. Because of this, if the 90°-extended support leg 10 is caused to accidentally impinge against an object or the surface on which the portable screen assembly S1 is installed during movement or installation thereof, there is a possibility that a relatively large force may be obliquely applied to the support leg 10. Such a force, however, presses the support branches 10a inwardly and, hence, the support leg 10 is folded, avoiding damage thereof.

That is, the support leg 10 has the following advantages.

(1) The support leg 10 is formed into a generally U-shape and has an elasticity by virtue of separation of the proximal ends thereof. Accordingly, the support leg 10 can be easily folded by making use of the elasticity.

(2) Because a force applied to the support leg 10 can be dispersed by the plurality of walls 10b formed on the proximal end of the support leg 10, even a relatively soft and fragile material such as a resin can withstand a large force.

(3) When the support branches 10a are pressed inwardly to approach each other, an inward movement of the walls 10b is hindered by the downwardly extending walls 40a of the leg mount 40. Accordingly, there does not occur that only one of the support branches 10a is drawn near to the center of the leg mount 40, facilitating the folding operation of the support leg 10.

(4) Because the inclined surfaces 10e, 10g are formed on the front and rear sides of each projection 10d, respectively, to abut against the side edge 40d of the associated downwardly extending wall 40a, not only the lead-in force of the support leg 10 is generated during folding thereof, but also the support leg 10 is not damaged even if an external force is suddenly applied thereto under the condition in which the support leg 10 has been extended. Furthermore, even if one or some of the support legs 10 are damaged, only the damaged support leg or legs 10 can be easily replaced.

Figure 16:
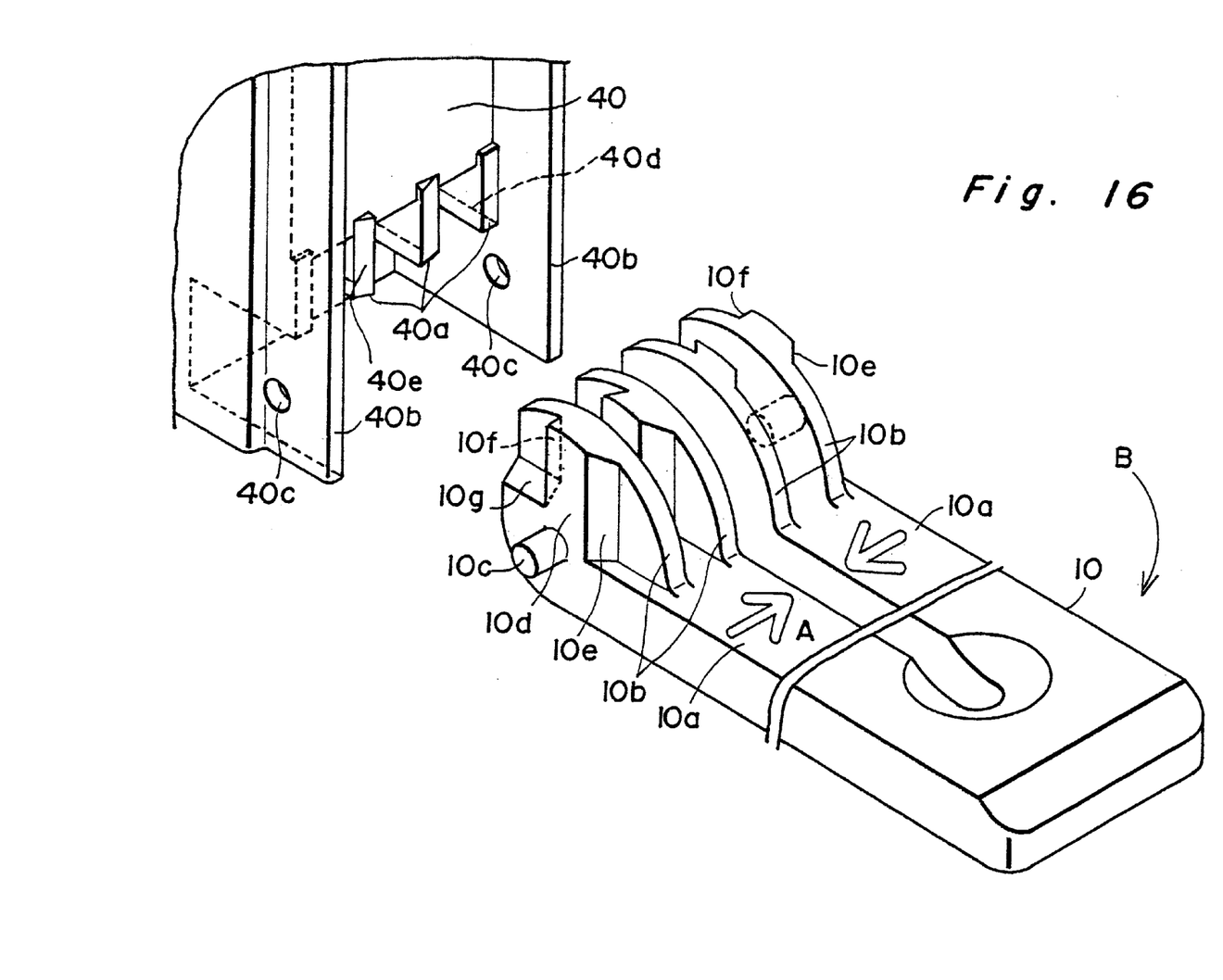
FIG. 16 is a modification of the connecting portion of FIG. 15.

FIG. 16 depicts a modified form of the support leg 10 and the leg mount 40 shown in FIG. 15.

In the modification shown in FIG. 16, of the plurality of downwardly extending walls 40a corresponding to each support leg 10, inner two walls 40a have respective front surfaces 40e inclined or tapered outwardly, while inner two walls 10b of the support leg 10 have respective inclined or tapered rear surfaces 10f complementary to the associated front surfaces 40e of the downwardly extending walls 40a.

By this construction, when the support leg 10 has been extended, abutment of the inclined rear surfaces 10f of the projections 10d of the inner two walls 10b against the inclined front surfaces 40e of the inner two downwardly extending walls 40a is not readily released. Accordingly, the resistance to folding of the support leg 10 is increased, making it possible to support the frames 2, 4 more positively.

Although the present invention has been fully described by way of examples with reference to the accompanying drawings, it is to be noted here that various changes and modifications will be apparent to those skilled in the art. Therefore unless such changes and modifications otherwise depart from the spirit and scope of the present invention, they should be construed as being included therein.

What is claimed is:

1. A portable screen assembly comprising:
   first and second frames extending parallel to each other;
   a spring-biased roll rotatably mounted in said first frame;
   a screen bonded at one end thereof to said second frame and wound around said spring-biased roll;

a plurality of support legs to support said first and second frames approximately vertically during use; and an extender to bias said first and second frames away from each other to impart a predetermined tension to said screen, said extender including:

a first rail hingedly connected to said first frame at one point only;

a second rail hingedly connected to said first rail;

a third rail hingedly connected to said first rail;

a fourth rail hingedly connected to said second and third rails, said fourth rail also being hingedly connected to said second frame at one point only;

said one point of connection of said first rail to said first frame and said one point of connection of said fourth rail to said second frame being at substantially the same level along the lengths of said first and second frames, respectively; and an elastic member connected to a position of hinged connection between said first and third rails and connected to a position of hinged connection between said second and fourth rails, said elastic member having an elastic force determined appropriately relative to an elastic force of a spring mounted in said spring-biased roll so that said first and second frames can be retained at a desired interval.

2. An assembly as claimed in claim 1, wherein said first and second frames define casings to accommodate and protect said spring-biased roll, said screen and said extender when said assembly is not in use.

3. An assembly as claimed in claim 1, wherein each said support leg comprises a plurality of first walls having respective projections, each of said first and second frames has a plurality of second walls, said support leg is retained in an extended position by abutment of said first walls with said second walls, and said support leg is folded from said extended position by releasing abutment of said first walls with said second walls.

4. An assembly as claimed in claim 3, wherein each said projection has on a first side thereof a first inclined surface, and a lead-in force of the respective said support leg onto the respective one of said first and second frames during folding of said respective support leg is generated by causing said first inclined surface to abut against an edge of a respective said second wall.

5. An assembly as claimed in claim 4, wherein each said projection has on a second side thereof a second inclined surface to abut an edge of a respective said second wall when said respective support leg is in said extended position thereof, thereby preventing an external force from damaging said respective support leg.

6. An assembly as claimed in claim 5, wherein said first and second inclined surfaces extend in direction to cross each other.

* * * * *